UNITED STATES PATENT OFFICE.

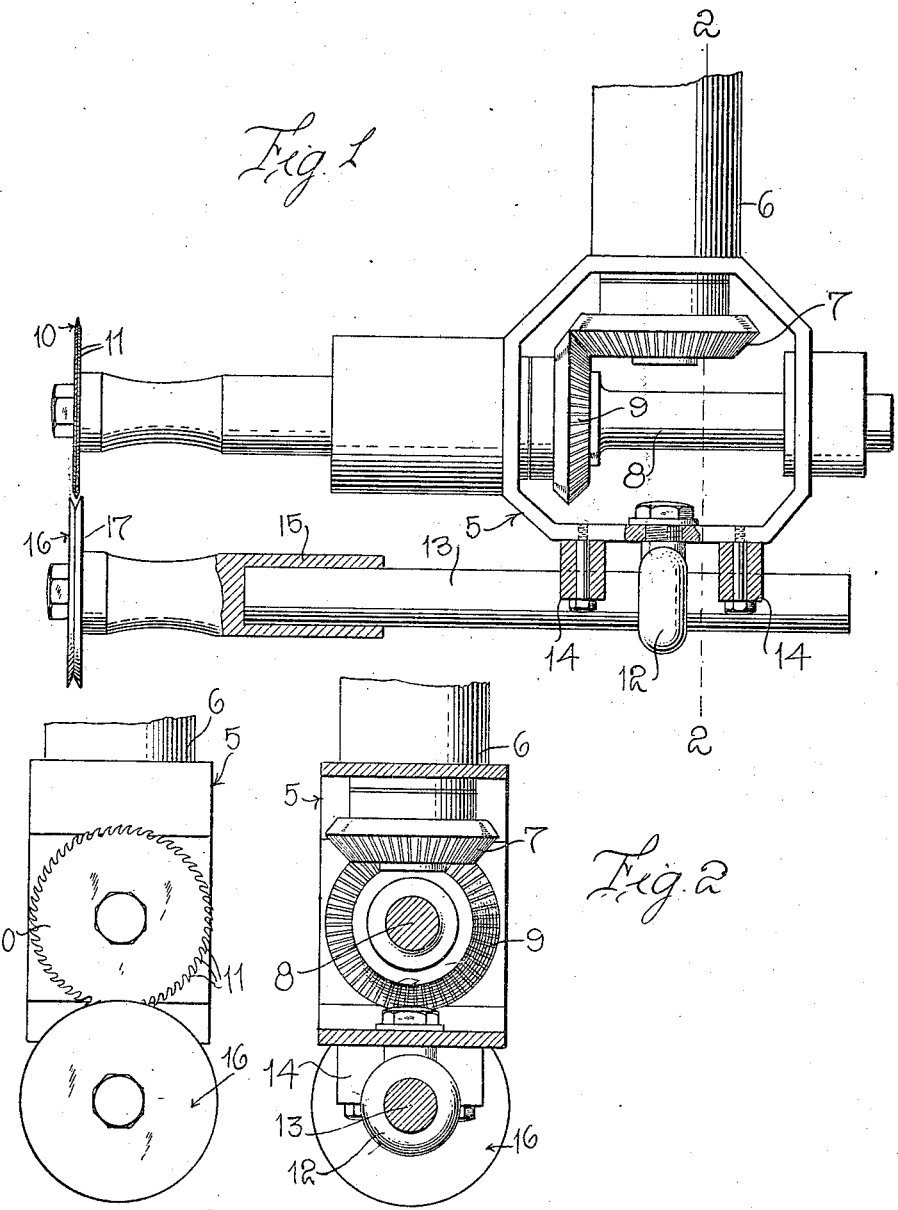

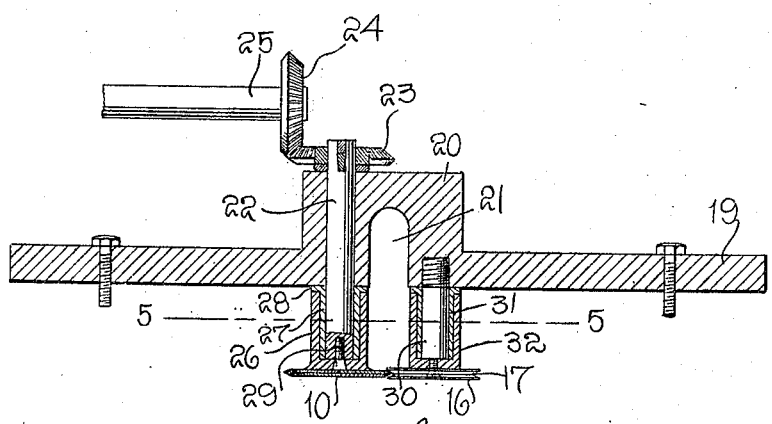
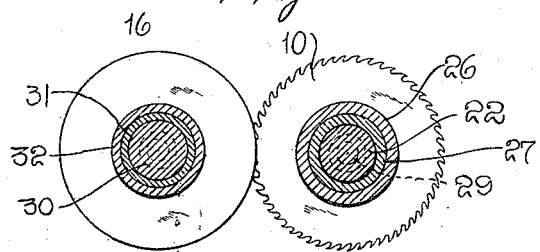

CLYDE C. CURTIS AND HOWARD J. SACKETT, OF ANACORTES, WASHINGTON.

FISH-DRESSING MACHINE.

1,275,229.      Specification of Letters Patent.     Patented Aug. 13, 1918.

Application filed November 14, 1917. Serial No. 201,963.

*To all whom it may concern:*

Be it known that we, CLYDE C. CURTIS and HOWARD J. SACKETT, citizens of the United States, residing at Anacortes, in the county of Skagit and State of Washington, have invented certain new and useful Improvements in Fish-Dressing Machines, of which the following is a specification, reference being had to the accompanying drawings.

This invention relates to certain improvements in fish dressing machines such as are used in the preparation of fish for the purpose of canning.

The present invention more particularly relates to fish tail and fin saws, and has for its primary object to provide simple and efficient means for cleanly severing the fish tail and dorsal fin from the body as the fish are fed through the machine.

It is another object of our invention to provide fish tail and fin saws each embodying a positively driven rotary saw blade and a second rotary blade having a circumferential kerf in its periphery to receive the teeth on the edge of the first named blade of the kerf therein.

It is a further general object of our invention to simplify and improve the construction of fish dressing machines in the particulars above referred to and without increasing the manufacturing cost of the machine as a whole.

With the above and other objects in view the present invention consists in the improved combination, construction and relative arrangement of the several parts as will be hereinafter more particularly described, claimed and illustrated in the accompanying drawings, in which;

Figure 1 is a side elevation partly in section illustrating the preferred embodiment of our improved fish tail saw.

Fig. 2 is a section taken on the line 2—2 of Fig. 1.

Fig. 3 is an end elevation.

Fig. 4 is a side elevation illustrating the saw blades mounted and arranged for the purpose of removing the fish tail and fin, certain of the parts being shown in section.

Fig. 5 is a sectional view taken on the line 5—5 of Fig. 4.

Referring in detail to the drawings and more particularly to Figs. 1, 2 and 3, 5 designates a bearing frame which may be of any suitable form and construction. In this frame one end of an operating shaft 6 is rotatably mounted and upon said shaft a beveled gear 7 is fixed.

A second shaft 8 is mounted in the frame 5 and extends at right angles to the operating shaft 6. The shaft 8 also has a beveled gear 9 fixed thereon and in constant mesh with the gear 7.

The shaft 8 extends for a suitable distance beyond one side of the frame and upon the extremity of this extended portion of the shaft a circular saw blade 10 is securely fixed. This saw blade is provided on its periphery with a continuous series of very fine saw teeth indicated at 11.

To the frame 5 an eye-bolt 12 is securely fixed and in this eye-bolt a stationary rod 13 is supported. The rod 13 extends in parallel relation to the shaft 8 and at each side of the eye-bolt 12 said rod is braced by means of bearing blocks 14 which are suitably secured to the frame 5. Upon one end of the rod 13 a sleeve 15 is loosely mounted to freely rotate. This sleeve beyond the rod 13 is formed with a solid end portion, to the extremity of which a blade 16 is fixed. This blade is formed in its periphery with a circumferentially extending groove or kerf 17 which is quite deep and at each side of this kerf the blade is smooth and sharp. As clearly shown in Fig. 1 of the drawing the fine toothed edge of the blade 10 extends within the kerf or groove 17 in the blade 16, it being understood that when the feeding of fish through the machine is not taking place, the blade 16 remains stationary while the blade 10 is positively rotating.

During the operation of the device as above described, the fish are fed through the machine by an approved mechanism such as is commonly known in the art, and are carried between the shaft 8 and the sleeve 15. The tails of the fish are engaged between the continuous toothed edge portions of the blade 10 and the smooth blade 16, the blade 10 rotating in the direction of movement of the fish and forcing and sawing the fish tails upon the smooth blade 16. It will be understood that the sharpened edges of the blade 16 do not cut through the fish, but simply grip and hold the fish against longitudinal shifting movement during the cutting action of the saw. Thus the saw teeth of blade 10 will cut through the fish tail and cleanly sever the tail from the body of the fish for the reason that the smooth blade 16 holds the tail securely against the saw blade 10. As above stated, the sleeve 15 is loose upon the fixed rod 13 so that as the saw operates to sever the fish tail and the fish leave the teeth of the blade 10 this sleeve 15 will rotate upon the rod 13. Thus a new portion of the smooth edged blade 16 is presented for co-action with the teeth of the blade 10 in cutting off the tail of each fish. It will thus be appreciated that the fish tails are cleanly severed or cut off without waste of the fish.

In Figs. 4 and 5 of the drawings, we have illustrated the saw blade 10 and the smooth blade 16 mounted and arranged for the purpose of severing or cutting off the dorsal fin of the fish. To this end we provide a supporting plate 19 which is suitably fixed to convenient parts of the machine frame, said plate at its center having an off-set yoke-shaped section 20 which provides an opening indicated at 21 through which the dorsal fin may freely pass. In one arm of this yoke portion 20 of the plate a positively rotated shaft 22 is mounted, the said shaft having a gear 23 fixed on one end and meshing with a similar gear 24, on the end of the operating shaft 25.

The circular saw blade 10 is fixed to one end of a sleeve 26 which is engaged upon a bushing 27 disposed upon one end of the shaft 22 and having a flange 28 on one of its ends abutting against the supporting plate 19. The saw blade 10 is fixed upon the shaft 22 by means of a screw indicated at 29 which is threaded in an axial bore provided in the end of said shaft.

In the other arm of the circular yoke 20 formed in the plate 19 one end of a stud or pin 30 is threaded and upon this stud a flanged bushing 31 is engaged. A sleeve 32 is loosely disposed over said bushing and to one end of this sleeve the blade 16 is suitably fixed. Thus it will be seen that this blade 16 is mounted for rotative movement when the saw blade 10 coöperates therewith in severing the dorsal fin in the same manner as in the operation of the tail saw hereinbefore described.

From the foregoing description taken in connection with the accompanying drawings, the construction, manner of operation and several advantages of our invention will be clearly and fully understood. We have found the device to be highly effective and reliable in practical use as an adjunct to fish cleaning machines such as are used in large canning establishments. By means of our invention the fish tails and dorsal fins are cut off or severed and without waste of the flesh, irrespective of the rapidity with which the fish may be fed through the machine. The device may be very easily modified in the means for mounting the saw blade and smooth blade and adapted for use in connection with various constructions of fish cleaning or dressing machines. It will also be appreciated that as a whole our invention is very simple and durable in its construction and will not materially add to the initial cost of manufacture of such machines.

While we have shown and described the present form, construction and relative arrangement of the several elements, it is to be understood that the device is susceptible of considerable modification therein, and we therefore reserve the privilege of adopting all such legitimate changes as may be fairly embodied within the spirit and scope of the invention as claimed.

What we claim is:

1. In a fish dressing machine, a positively rotated circular cutting saw blade, a second smooth blade loosely mounted and supported to rotate in the plane of said first named saw blade and having a continuous kerf in its periphery to receive the cutting saw edge of said first named saw blade, said second named blade having a continuous gripping edge at each side of kerf thereon.

2. In a fish dressing machine, a circular saw blade and means for positively rotating said blade, a second circular blade loosely mounted and supported to rotate in the plane of the said first named saw blade and having a continuous kerf in its periphery to receive the cutting teeth of said first named blade, said second named blade having a continuous sharp edge at each side of the kerf therein.

3. In a fish dressing machine, a circular cutting blade and means for positively rotating said blade, a second smooth blade loosely mounted for rotation in the plane of said first named saw blade and having a continuous kerf in its periphery to receive the cutting edge of the first named saw blade, said second named blade having a continuous sharp edge at each side of the kerf therein.

4. In a fish dressing machine, a circular saw blade and means for positively rotating said blade, a second circular smooth blade mounted and arranged in the plane of said first named blade and having smooth, sharp gripping edges between which the saw teeth of the first named blade are adapted to move in the rotation of said blade.

5. In a fish dressing machine, a circular saw blade and means for positively rotating said blade, a second circular blade mounted and supported in the plane of said first named blade and having a continuous kerf in its periphery to receive the cutting teeth of the first named blade, said second named blade having a continuous sharp gripping edge at each side of the kerf therein.

6. In a fish dressing machine, a circular saw blade and means for positively rotating the said blade, a second circular blade loosely mounted for casual rotation and disposed in the plane of said first named saw blade, said second named blade having continuous, sharp gripping edges between which the teeth on the first named blade are adapted to move in the rotation of said blade.

In testimony whereof we hereunto affix our signatures in the presence of two witnesses.

CLYDE C. CURTIS.
HOWARD J. SACKETT.

Witnesses:
W. J. ELLIOTT,
NORMAN A. ENGLISH.

Copies of this patent may be obtained for five cents each, by addressing the "Commissioner of Patents, Washington, D. C."